R. M. Treat.
Horse Rake.
N° 35572.  Patented Jun. 10, 1862.
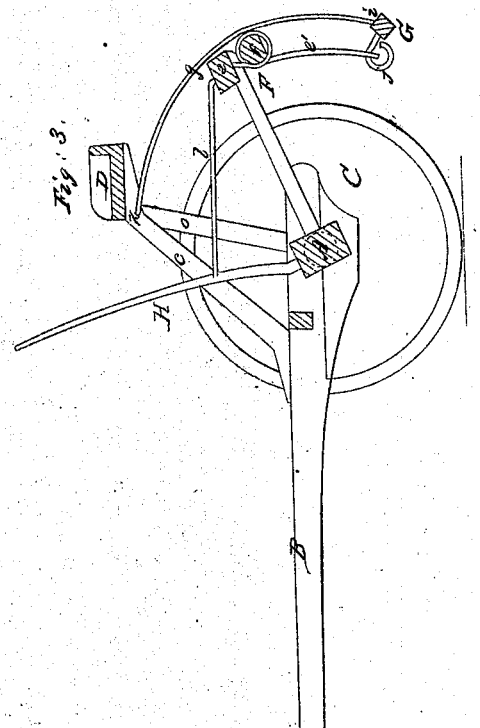
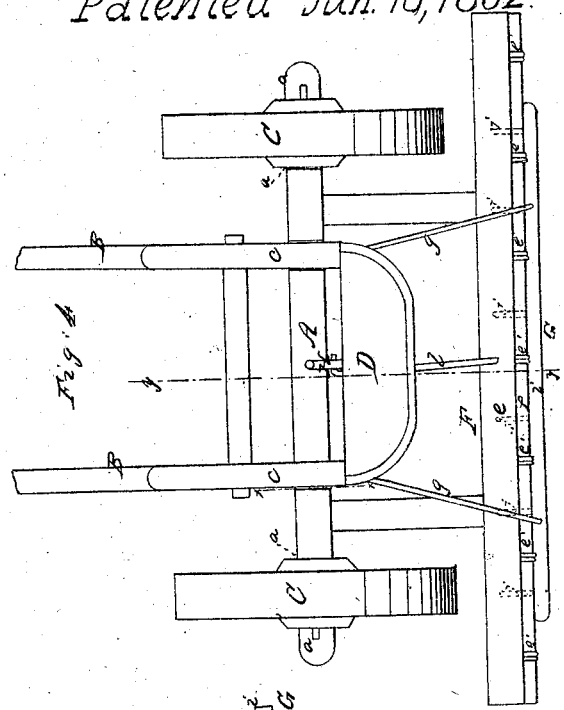
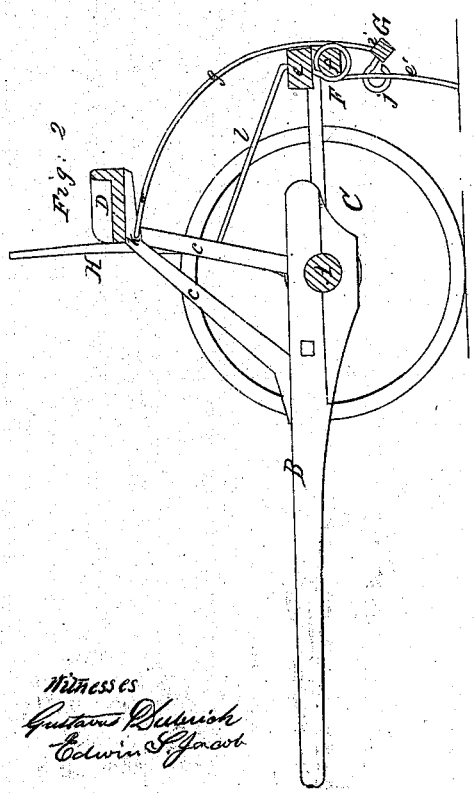
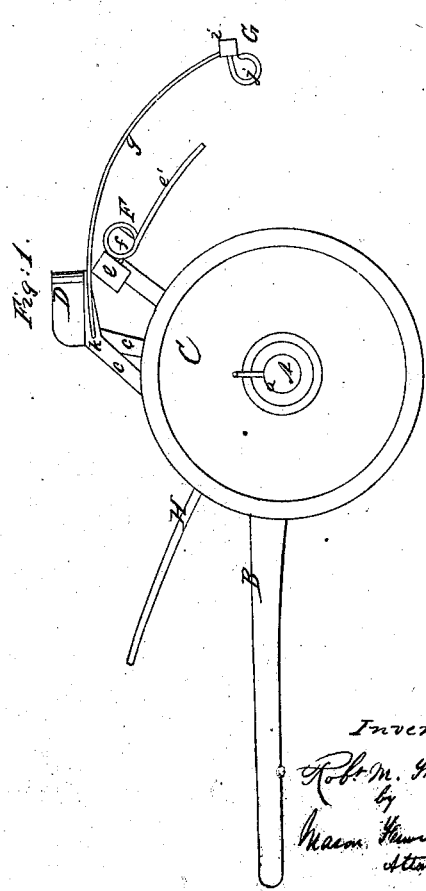

UNITED STATES PATENT OFFICE.

ROBERT M. TREAT, OF MORRIS, CONNECTICUT, ASSIGNOR TO HIMSELF AND GEORGE H. DALEY, OF SAME PLACE.

IMPROVEMENT IN HORSE-RAKES.

Specification forming part of Letters Patent No. 35,572, dated June 10, 1862.

*To all whom it may concern:*

Be it known that I, ROBT. M. TREAT, of Morris, in the county of Litchfield and State of Connecticut, have invented a new and useful Improvement in Horse-Rakes; and I do hereby declare that the following is a full, clear, and exact description of the same, reference being had to the accompanying drawings, forming part of this specification, in which—

Figure 1 is a side elevation of my improved rake, the parts being thrown up out of operative position. Fig. 2 is a longitudinal section, the parts being thrown down into operative position. Fig. 3 is a similar section of the rake, the parts being adjusted to the discharging and clearing position. Fig. 4 is a plan or top view.

Similar letters of reference in the several figures indicate corresponding parts.

My rake is composed of an axle, A, two shafts, B B, two wheels, C C, an elevated seat, D, a raker, F, a clearer or discharger, G, eccentric-rods $g\,g$, a frame or bars, $d\,d$, and a hand-lever, H.

The wheels C C are arranged to turn on journals $a\,a$ of the axle, and the shafts B B are boxed or fitted (so as to turn) to intermediate journals $b\,b$ of the same, as shown. On the rear part of the shafts the seat D is arranged, being mounted on standards $c\,c$, which extend up from the shafts. From the top of the axle in front of the seat the hand-lever H extends so as to be convenient to the driver, who sits upon the seat. From the rear of the axle two bars, $d\,d$, extend out beyond the circumference of the wheels C, and to the ends of these bars the rake-head $e$ is firmly attached. These bars are rigid with the axle A, and rise as it turns in the hubs of the wheel. The rake-head $e$ is of a length much greater than the axle, and its ends terminate some distance beyond the outer faces of the wheels. In the rake-head short spring-teeth $e'$ are set and coiled around a nearly-round bar, $f$, thereof, as shown. From the side of each of the standards $c\,c$ a curved rod, $g$, extends back beyond the rake-head eccentrically to the axle, and on the outer ends of these rods a long bar, $i$, is hung. This bar has wire or other character of stops $j\,j$ extending from its front side, so that they pass between the teeth of the rake F when the parts are in the position shown in Fig. 2. The rods $g$ are pivoted to the standards, and are free to swing at $k\,k$ when the raker is raised or lowered. A rod, $l$, connects the raker to the hand-lever, as shown, so that when the rod is moved forward the raker is elevated. The gravity of the raker insures its descent.

I think it is evident, from the foregoing description, that my horse-rake turns up by reason of the turning of the axle with the hand-lever; also, that the axle does not revolve with the wheels; farther, that when the raker and axle are turned to the position shown in Fig. 3 the stops $j\,j$ cause the load or quantity of hay collected upon the teeth to discharge; and, finally, that any further elevation of the raker causes the rake-head to come in forcible contact with the rods $g$ of the clearer, and force said rods, with the bar $i$ and its stops $j$, outward and upward, as shown in Fig. 1, so as to clear the windrow and other obstructions.

I am aware that stationary clearing or discharging rods have been used in connection with horse-rakes. I also am aware that rake-teeth have been attached directly to a turning or partly-turning axle; but stationary clearers are objectionable, as they cannot be adjusted so as perfectly to pass over obstructions; and attaching the teeth of the raker to the axle directly is also objectionable, as the raker cannot be broad enough to take in a large quantity of hay unless the axle be made of too great a length, which is objectionable, from the inconvenience of moving the carriage part of the rake through gates, and more especially because of the liability of long axles breaking in two when the weight of the driver rests upon the seat.

With my arrangement the length of the hubs of the two wheels can be added to the length of the rake-head without adding to the length of the axle, and therefore a much longer rake-head and a much shorter axle can be used without the inconveniences being experienced.

I do not claim a long raker and short axle combined, when the raker is arranged in front of the circumference of the wheels and extends beyond the outer faces of the wheels; but I do claim as my invention and desire to secure by Letters Patent—

1. The rigid bars $d\,d$ or their equivalents, extending out from the turning axle A *a b* beyond the rear of the circumference of the wheels for supporting a long raker with short teeth, in the manner and for the purpose as herein described.

2. The swinging adjustable clearer or discharger G, arranged and operating substantially in the manner and for the purpose described.

3. The raker F, in combination with the curved eccentric-rods *g g* and discharger or clearer G, constructed and operating substantially in the manner and for the purpose described.

4. The arrangement of the wheels C C, axle A *a b*, shafts B B, seat D, bars *d d*, and raker F with hand-lever H, in the manner and for the purpose described.

Witness my hand in the matter of my application for a patent for an improved horse-rake this 21st day of April, A. D. 1862.

ROBERT M. TREAT.

Witnesses:
JOS. B. SPENCER,
L. S. DAVIES.